Lloyd E. Ayler
INVENTOR.

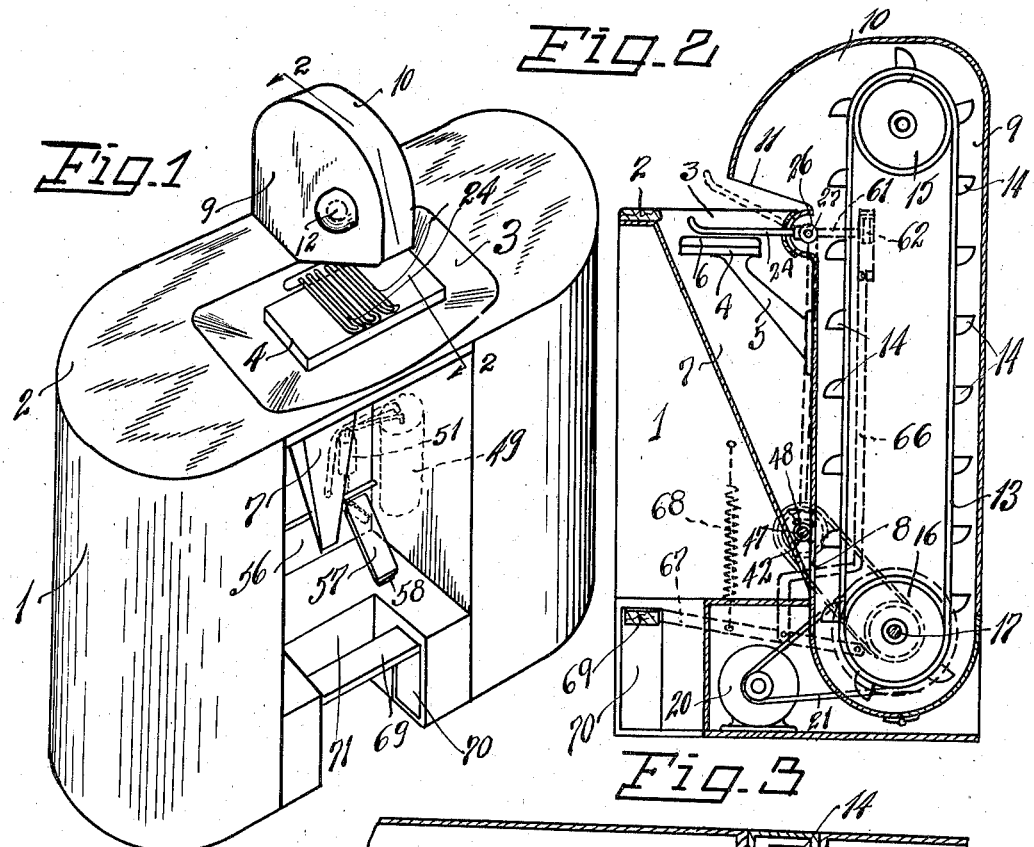
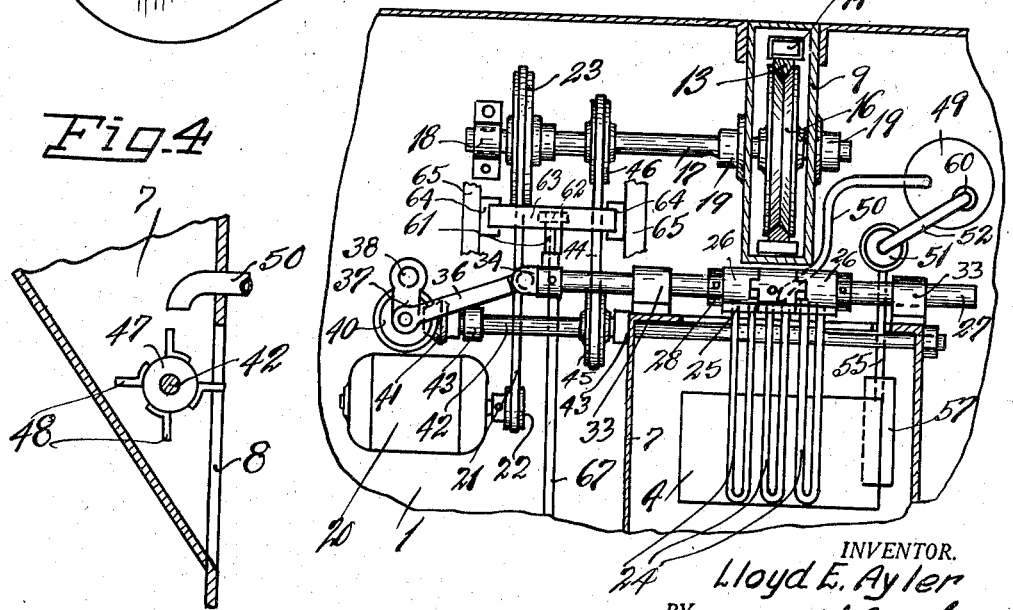

BY
ATTORNEYS.

Patented July 2, 1940

2,206,148

UNITED STATES PATENT OFFICE 2,206,148

FUR CLEANING MACHINE

Lloyd Edward Ayler, Spokane, Wash.

Application March 7, 1939, Serial No. 260,377

6 Claims. (Cl. 15—4)

This invention relates to a fur cleaning machine and has as one of its objects to provide a machine by the use of which furs may be very easily and thoroughly cleaned instead of by the laborious hand methods now used.

Another object of the invention is to provide a fur cleaning machine which is so constructed that during the cleaning, moist saw dust will be deposited upon the furs and the furs then agitated to distribute the saw dust through the furs for gathering dirt and subsequent dislodgement of the saw dust from the furs.

Another object of the invention is to not only cause the saw dust to be distributed through and subsequently dislodged from the furs, together with dirt taken up by the moist saw dust, but also to carry out this operation in such a manner that the furs when cleaned will be fluffy and attractive in appearance.

Another object of the invention is to provide very efficient means for delivering moist saw dust upon a fur to be cleaned and, in addition, provide means for moistening the saw dust prior to return of the saw dust from a receptacle or chamber under the cleaning table into the lower portion of a housing for a conveyor which deposits the saw dust onto the furs.

Another object of the invention is to provide a machine of this character wherein the saw dust is moistened by water sprayed thereon when necessary, foot operated means being provided for creating air pressure in the water container when it is desired to spray the saw dust.

Another object of the invention is to provide a machine having fur rubbing fingers mounted for reciprocating motion in a horizontal direction and being also movable vertically to a raised position when furs are to be set in place upon the cleaning table or removed therefrom.

Another object of the invention is to provide a fur cleaning machine which is of compact construction and very easy to operate.

The invention is illustrated in the accompanying drawings, wherein:

Fig. 1 is a perspective view of the fur cleaning machine.

Fig. 2 is a vertical sectional view transversely through the machine along the line 2—2 of Fig. 1.

Fig. 3 is a view showing a portion of the cabinet or housing of the fur cleaning machine in transverse section and mechanism within the housing in top plan.

Fig. 4 is a sectional view taken vertically through the lower portion of the saw dust receiving chamber at the upper end of which the cleaning table is mounted.

Figure 7:
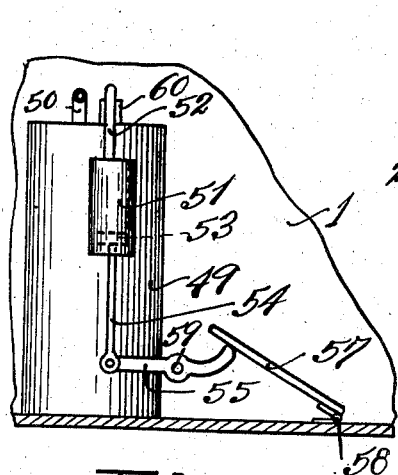
Fig. 7 is a view showing the water tank and associated mechanism in side elevation.

The cabinet or housing 1 of this fur cleaning machine may be formed of metal or other desired materials and has its top 2 formed with an opening 3 through which is exposed a table 4 upon which the portion of the fur being cleaned rests. The table 4 is supported by a bracket 5 and has its upper surface covered by a pad or cushion 6 formed of sponge rubber or the like which will be soft and yielding. A casing defining a saw dust receiving chamber or hopper 7 is mounted vertically in the cabinet or housing midway the width thereof and adjacent its lower end is provided with a discharge opening 8 through which saw dust is discharged into the lower portion of the vertically disposed conveyor casing 9. This casing extends vertically, as shown in Fig. 2, with its upper portion projecting above the housing or cabinet 1 and formed with a hood 10 having a discharge opening 11 over the table 4. A light 12 has been shown at one side of the open forward portion of the hood for illuminating the table and it is to be understood that a similar light may be provided at the other side of the hood. By means of these lights the table and the top of the cabinet will be well illuminated and a workman can see clearly during a cleaning operation.

An endless conveyor belt 13 extends vertically in the casing 9 with its upper portion trained about an idler pulley 15 and its lower portion engaged about a pulley 16 carried by a drive shaft 17. The shaft 17 is journaled transversely through the lower portion of the casing 9 and projects laterally from one side thereof with its extremities rotatably mounted in the bearing 18, the end portion of the drive shaft carrying the pulley 16 being mounted in the bearings 19 at opposite sides of the conveyor casing. During rotation of the drive shaft and the pulley 16, the buckets or cups 14 pick up moist saw dust in the lower portion of the conveyor casing and since the belt moves rapidly the saw dust will be thrown from the cups as the cups pass about the upper pulley and pass through the opening 11 onto furs extending across the open top of the hopper 7 and resting on the table 4. As the opening 3 is a great deal larger than the table, the saw dust will drop into the hopper when dislodged from the fur. Rotary motion is transmitted to the drive shaft from the motor 20 through the medium of a belt 21 trained about the small pulley 22 of the motor and the large pulley 23 carried by the drive shaft.

Figure 5:
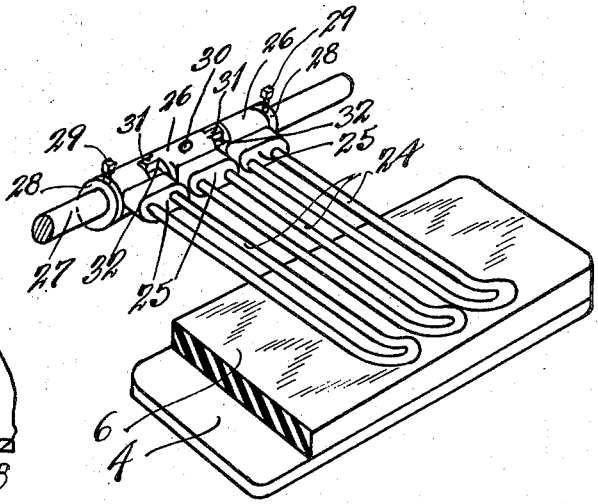
Fig. 5 is a perspective view of the cleaning table and the fingers mounted over the same for rubbing the fur during cleaning.
Figure 6:
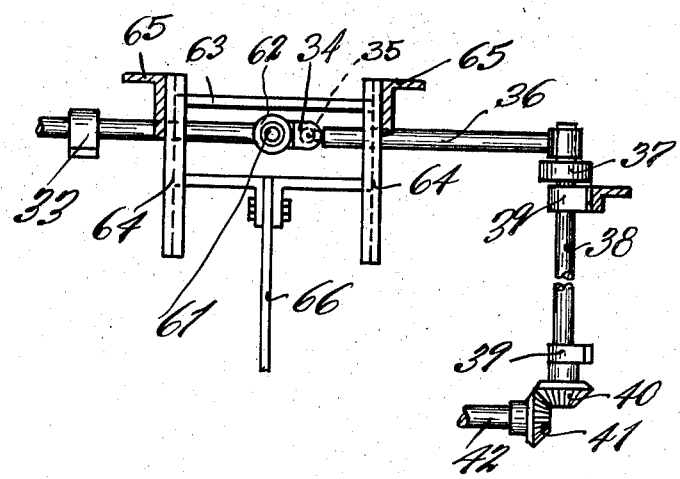
Fig. 6 is a fragmentary view showing a portion of the operating mechanism in elevation.

When the moist saw dust is deposited on the fur, it must be worked through the same and eventually dislodged so that it will drop into the hopper 7. In order to accomplish this, there has been provided rubbing fingers 24. These fingers are formed from metal strands or light rods which are bent to assume an elongated U-shape, the free front ends of the fingers being blunt and curved upwardly to a slight degree and the rear or inner ends of the fingers being carried by blocks 25 projecting forwardly from sleeves 26. These sleeves are mounted about the shaft 27 between collars 28 which are fixed to the shaft by set screws 29. Referring to Fig. 5, it will be seen that the intermediate sleeve 26 is secured in a fixed position on the shaft by a set screw 30 and is formed with side lugs 31 whereas the end sleeves are loose upon the shaft and formed with recesses 32 at their inner ends into which the lugs 31 engage. Therefore, the lugs of the center sleeve will limit turning of the end sleeves about the shaft and normally maintain the end fingers in the same plane as the center finger. Since the recesses 32 are of sufficient dimensions to loosely receive the lugs 31 the end sleeves may have limited turning movement about the shaft 27 and the end fingers may have limited tilting movement independent of the center finger. This permits fur to be easily moved under the fingers when the shaft is turned to swing the fingers upwardly to the raised position indicated by dotted lines in Fig. 2. It should also be noted that when the fingers are in their normally lowered position and the shaft 27 reciprocated longitudinally to move the fingers across fur resting on the table, the end fingers can have sufficient vertical movement to prevent them from catching and causing jamming of the fur under the fingers.

The shaft 27 is rotatably and slidably mounted through bearings 33 and, at one end, carries a coupling 34 in which a spherical knob 35, at the adjacent end of a pitman rod 36, is engaged to pivotally connect the pitman with the shaft and permit the shaft to have rotary motion relative to the pitman when vertically shifting the fingers from their normal position to raised position. The outer end of the pitman is pivoted to a crank arm 37 at the upper end of a shaft 38 which is rotatably mounted in bearings 39 and, at its lower end, carries a gear 40 meshing with a companion gear 41 at one end of a shaft 42. This shaft 42, which extends horizontally, is rotatably mounted in bearings 43 and rotary motion is transmitted thereto by a belt 44 trained about pulleys 45 and 46 carried by the shaft 42 and the shaft 17. It will thus be seen that during operation of the machine, the shaft 27 and the fingers carried thereby, will be shifted longitudinally of the table and, as moist saw dust is deposited on fur under the fingers, the fingers will be moved back and forth through the fur to distribute the saw dust through the fur to take up dirt therein and eventually dislodge the saw dust from the fur. By repeated applications of the moist saw dust, the fur will eventually be thoroughly cleaned and fluffed. The saw dust accumulates in the lower portion of the hopper 7 and, in order to discharge the saw dust through the opening 8 into the conveyor casing, there has been provided a wheel 47 fixed upon the shaft 42 within the hopper and carrying arms 48 for agitating the saw dust and impelling it toward the outlet opening 8.

The saw dust must be kept moist and, in order that water may be supplied thereto when necessary, there has been provided a water tank 49 which is mounted vertically in the housing in spaced relation to one side of the conveyor casing, as shown in Figures 1 and 3. A discharge pipe 50 extends from the water tank into the lower portion of the hopper a short distance above the agitator wheel 47 where it is turned downwardly, as shown in Fig. 4, so that water discharged from the pipe will flow downwardly onto the saw dust in the hopper. Air under pressure is employed as the means for forcing water from the tank through the pipe 50 and, in order that air pressure may be built up in the upper portion of the tank to force water out of the same through the pipe, there has been provided a pump cylinder 51 having a pipe 52 leading therefrom to the top of the water tank. A piston 53 carried by a piston rod 54, is slidably mounted in the cylinder and the lower end of the piston rod is pivoted to a lever 55 which passes through the wall of the housing and into the alcove 56 thereof. A treadle 57 is pivoted to the bottom of the alcove by the hinge 58 and the inner or rear end portion of the treadle rests upon the outer end of the lever so that when the operator of the machine applies foot pressure upon the treadle, the lever will be rocked about its pivot 59 and the piston rod forced upwardly to shift the piston toward the top of the cylinder and air forced into the upper portion of the water tank. The check valve 60 retains air in the tank under pressure and, as soon as sufficient pressure has been built up in the tank, water will be forced therefrom and through the pipe 50 from which it is discharged onto the saw dust. This can be accomplished with a few applications of pressure upon the treadle.

As previously stated, the shaft 27 is to be rocked in the bearings 33 in order to swing the fingers upwardly and permit fur to be placed thereunder or shifted along the table 4 after a portion of the fur has been cleaned. In order to do so, there has been provided an arm 61 which extends rearwardly from the coupling 34 and, at its rear end, carries a roller 62. When pressure is applied to the arm to swing it downwardly, the shaft 27 will be rotated in its bearings and the fingers swung upwardly. Downward pressure is applied to the roller through the medium of a frame 63 disposed about the arm and mounted for vertical sliding movement in guides or tracks 64 carried by cross bars 65 extending horizontally in the housing. This frame is attached to the upper end of a rod 66 which extends vertically in the housing and has its lower portion bent forwardly and then downwardly, as shown in Fig. 2, and pivoted to a lever 67. The lever extends horizontally in the lower portion of the housing and is yieldably held in its raised position by a spring 68 with the rod 66 shifted upwardly and the frame 63 out of engagement with the roller and the fingers 24 in their lowered position. The front end of the lever 67 is provided with a side arm or pedal 69 extending transversely of the alcove through an opening 70 formed at one side of the pit 71 at the bottom of the alcove. By placing a foot upon the pedal, the operator of the machine exerts downward pressure on the lever and the rod 66 will be shifted downwardly to move the frame 63 into engagement with the roller and the arm 61 will be swung downwardly to raise the fingers. As the frame engages the roller instead of a portion of the arm, the roller will turn about the arm and reciprocating movement of the shaft 27 will not be retarded by friction. It will thus be seen that the fingers can be swung upwardly and fur placed under them or shifted along the table without stopping or interfering with the normal movement of the fingers and a temporary shut-down of the machine while inserting, shifting, or removing furs is not necessary.

Having thus described the invention, what is claimed is:

1. In a fur cleaning machine, a support for fur, a conveyor casing, a conveyor in said casing for intermittently depositing loose dirt-gathering material upon the fur, means for agitating the fur to distribute the dirt-gathering material and eventually dislodging the same from the fur, and means for receiving the dislodged dirt-gathering material and returning the same to the conveyor casing.

2. In a fur cleaning machine, a support for fur, a vertically disposed conveyor casing, an endless conveyor on said casing for intermittently depositing moist dirt-removing material upon the fur, means for agitating the fur to distribute the dirt-removing material through the fur and eventually dislodge the same from the fur, means for receiving the dislodged dirt-removing material and returning it to the lower portion of the conveyor casing, and means for moistening the dirt-removing material while in the receiving means.

3. In a fur cleaning machine, a support for fur, means for depositing dirt-removing material upon the fur, a shaft mounted for reciprocating movement and rotary adjustment, fingers extending from said shaft over said support for rubbing engagement with fur during reciprocation of said shaft to distribute the dirt-removing material through the fur and eventually dislodge said dirt-removing material from the fur, means for reciprocating said shaft, means for rotatably adjusting the shaft to swing the fingers upwardly out of operative engagement with fur, and means for moistening the dirt-removing material.

4. In a fur cleaning machine, a housing having a top formed with an opening, a fur supporting table mounted under the top and exposed through the opening, a conveyor casing disposed vertically in said housing and projecting upwardly through the top thereof back of said opening with its upper portion projecting forwardly in overhanging relation to the opening and formed with an outlet confronting the opening, a conveyor in said casing for carrying loose dirt-removing material upwardly therein and discharging the material through the outlet of the casing and downwardly through the opening of the housing onto fur resting on said table, a hopper extending downwardly from the opening in enclosing relation to said table and having an outlet opening at its bottom communicating with the lower portion of said casing, fingers movably mounted over said table, and means for actuating said fingers for rubbing engagement with fur on the table to distribute the cleaning material through the fur and eventually dislodge said material into said hopper for movement through its outlet back into the lower portion of said casing.

5. In a fur cleaning machine, a housing having a top formed with an opening, a fur supporting table mounted under the top and exposed through the opening, a conveyor casing disposed vertically in said housing, a conveyor in said casing for carrying loose dirt-removing material upwardly therein and discharging the material, a drive shaft rotatably mounted horizontally in said housing with a portion extending into said conveyor casing for operating the conveyor, a horizontal driven shaft rotated from said drive shaft, a reciprocating shaft mounted horizontally in said housing back of said opening, fingers extending forwardly from said reciprocating shaft and over said table, and means actuated from said driven shaft for imparting reciprocating movement to the reciprocating shaft and causing said fingers to have rubbing engagement with fur upon the table to distribute the dirt-removing material through the fur and eventually dislodge the material from the fur.

6. In a fur cleaning machine, a fur supporting table, a conveyor casing disposed vertically with its upper end portion in overhanging relation to the table and formed with an outlet, a conveyor in said casing for carrying loose dirt-removing material upwardly therein and discharging the material through the outlet of the casing onto fur resting on said table, a horizontal drive shaft rotatably mounted with a portion extending into said conveyor casing for operating the conveyor, a horizontal driven shaft rotated from said drive shaft, a reciprocating shaft mounted horizontally back of said table, fingers extending forwardly from said reciprocating shaft and over said table and at their rear ends having sleeves engaged about the reciprocating shaft, one sleeve being fixed to the shaft and having lugs engaged with sleeves of adjoining fingers, means actuated from said driven shaft for imparting reciprocating motion to the reciprocating sleeve, and means for rocking the reciprocating shaft to swing the fingers upwardly out of position for operative engagement with fur upon the shelf.

LLOYD EDWARD AYLER.